United States Patent
Wakabayashi et al.

(10) Patent No.: US 6,567,348 B1
(45) Date of Patent: May 20, 2003

(54) METHOD FOR RECORDING MARK LENGTH SHORTER THAN CHANNEL BIT LENGTH ON MAGNETO-OPTICAL MEDIUM

(75) Inventors: Kouichirou Wakabayashi, Toride (JP); Masafumi Yoshihiro, Kitasouma-gun (JP); Manabu Tani, Kitasouma-gun (JP)

(73) Assignees: Hitachi, Ltd., Tokyo (JP); Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/433,021

(22) Filed: Nov. 3, 1999

(30) Foreign Application Priority Data

Nov. 5, 1998 (JP) .......................................... 10-314299

(51) Int. Cl.[7] .............................................. G11B 11/00
(52) U.S. Cl. .................................. 369/13.54; 369/59.1
(58) Field of Search .......................... 369/13.54, 13.25, 369/13.26, 13.14, 13.24, 59.1, 59.12, 59.19, 116

(56) References Cited

U.S. PATENT DOCUMENTS

| | | | | |
|---|---|---|---|---|
| 5,091,897 A | * | 2/1992 | Otokawa et al. | 369/13 |
| 5,200,935 A | * | 4/1993 | Watanabe et al. | 369/13 |
| 5,485,433 A | * | 1/1996 | Satomura et al. | 369/13 |
| 5,953,289 A | * | 9/1999 | Miyaoka | 369/13 |
| 5,982,714 A | * | 11/1999 | Koda | 369/13 |
| 6,058,077 A | * | 5/2000 | Miyaoka | 369/13 |
| 6,069,852 A | * | 5/2000 | Miyaoka et al. | 369/13 |
| 6,192,008 B1 | * | 2/2001 | Kim | 369/13 |
| 6,315,061 B1 | * | 11/2001 | Miyaoka | 369/13 |
| 6,385,141 B1 | * | 5/2002 | Tani et al. | 369/13.54 |

FOREIGN PATENT DOCUMENTS

| | | |
|---|---|---|
| JP | 63-281229 | 11/1988 |
| JP | 4-265522 | 9/1992 |
| JP | 10-92036 | 4/1998 |
| WO | WO 98/02877 | 1/1998 |
| WO | WO 98/02878 | 1/1998 |

* cited by examiner

*Primary Examiner*—Tan Dinh
(74) *Attorney, Agent, or Firm*—Oliff & Berridge, PLC

(57) ABSTRACT

When recording marks having various lengths are recorded to represent information on a magneto-optical recording medium, a mark length-correcting circuit is used to correct a mark length nT with a mark length correction amount Lc determined for each mark length so that the recording is performed with a shorter mark length nT'=nT−Lc. When reproduction is performed on the magneto-optical recording medium, an appropriate reproducing light power and an appropriate reproducing magnetic field intensity can be easily selected for any recording mark having any length. Thus, the reproducing power margin is widened. The recording method is effective on a magneto-optical recording medium of the MAMMOS type comprising a recording layer and a reproducing layer, in which the light and the magnetic field are applied during the reproduction to transfer a magnetic domain from the recording layer to the reproducing layer in a magnified form.

26 Claims, 14 Drawing Sheets

CONVERSION TABLE IN MARK LENGTH-CORRECTING CIRCUIT

| MARK LENGTH | BEFORE CORRECTION OF MARK LENGTH | AFTER CORRECTION OF MARK LENGTH |
|---|---|---|
| 1T | 1111 | 0110 |
| 2T | 11111111 | 00111100 |
| 3T | 111111111111 | 000111111000 |
| 4T | 1111111111111111 | 0001111111111000 |
| ⋮ | ⋮ | ⋮ |

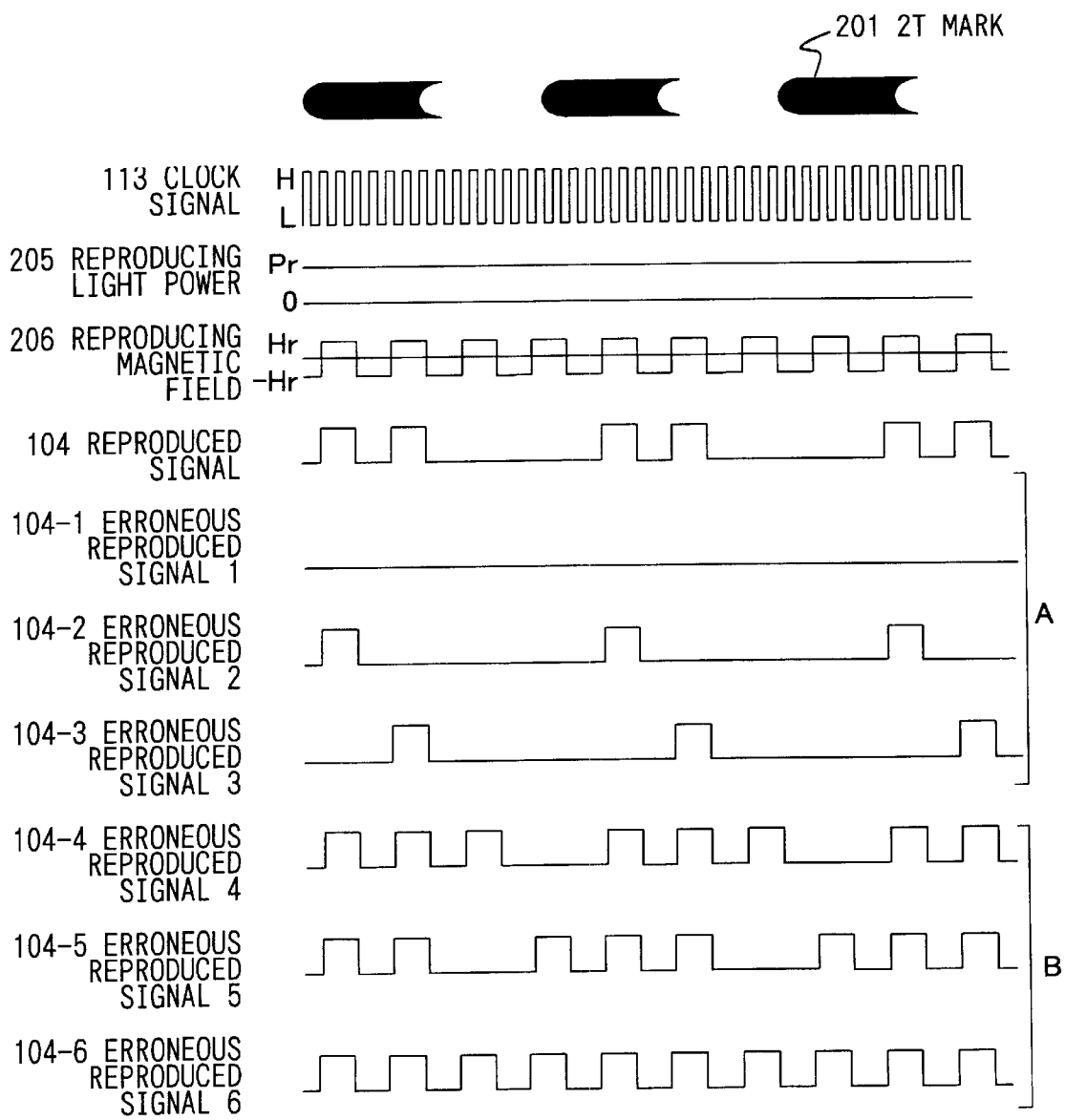

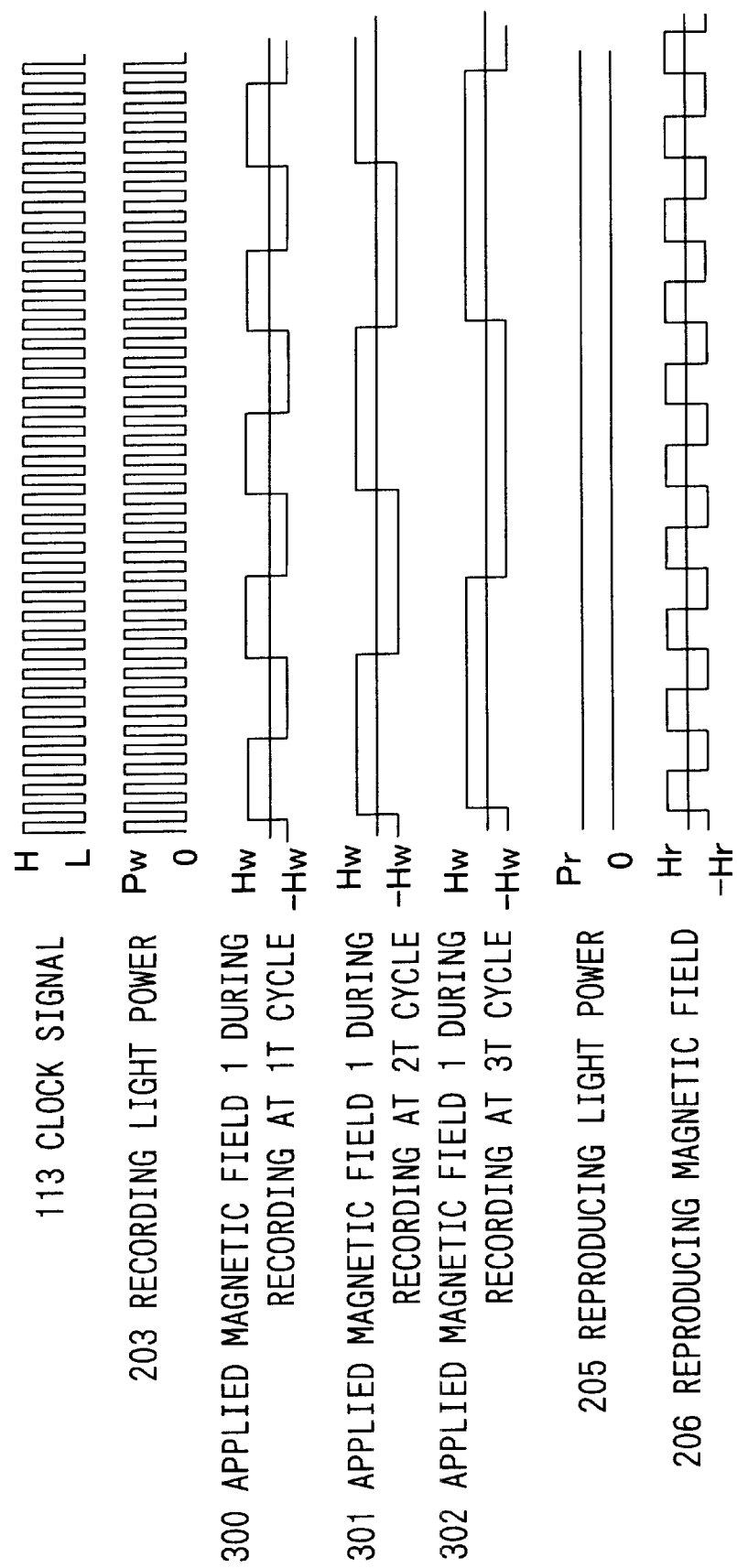

Fig. 7B

| | Hr | | | | |
|---|---|---|---|---|---|
| | 200 | 300 | 400 | 500 | 600 |
| 3.0 | | | | | |
| 2.9 | | | | | |
| 2.8 | | | | | |
| 2.7 | | | | | |
| 2.6 | 1 | | | | |
| Pr(mW) 2.5 | 1 | 1 | | | |
| 2.4 | 1 | 1 | | | 3 |
| 2.3 | | 1 | | 1 | 1,3 |
| 2.2 | | | 1 | 1,2 | 1,2 |
| 2.1 | | | 1,2 | 2 | 1 |
| 2.0 | | | | | |

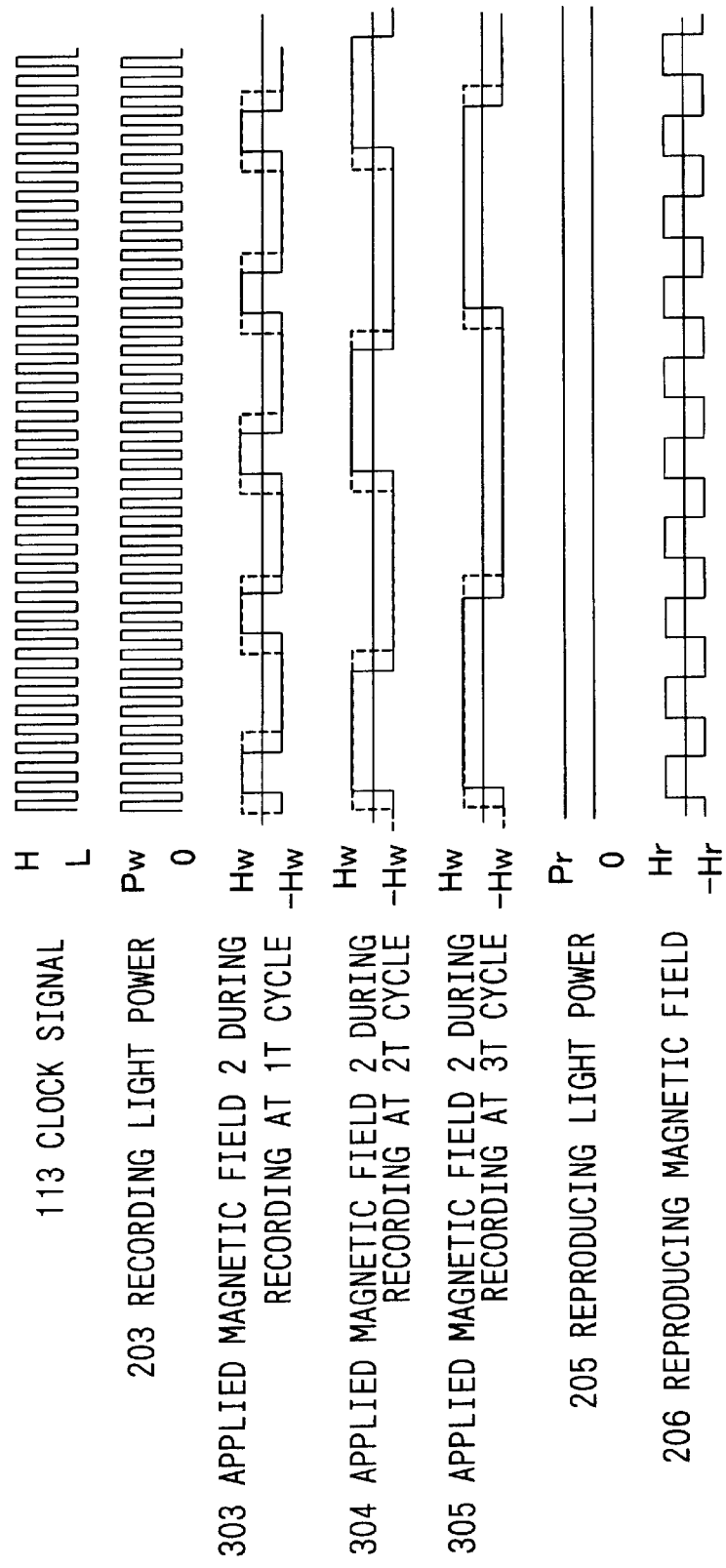

Fig. 8B

| | Hr | | | | |
|---|---|---|---|---|---|
| | 200 | 300 | 400 | 500 | 600 |
| 3.0 | | | | | |
| 2.9 | 1 | | | | |
| 2.8 | 1 | | | | |
| 2.7 | 1,2 | | | | |
| 2.6 | 1,2 | 3 | | | |
| Pr(mW) 2.5 | 2 | 1 | | | |
| 2.4 | | 1,2 | | | |
| 2.3 | | 1,2 | 3 | 3 | 2,3 |
| 2.2 | | | 1 | 1 | 2 |
| 2.1 | | | 1,2 | 1,2 | 1,2 |
| 2.0 | | | 1,2 | 1,2 | 1 |

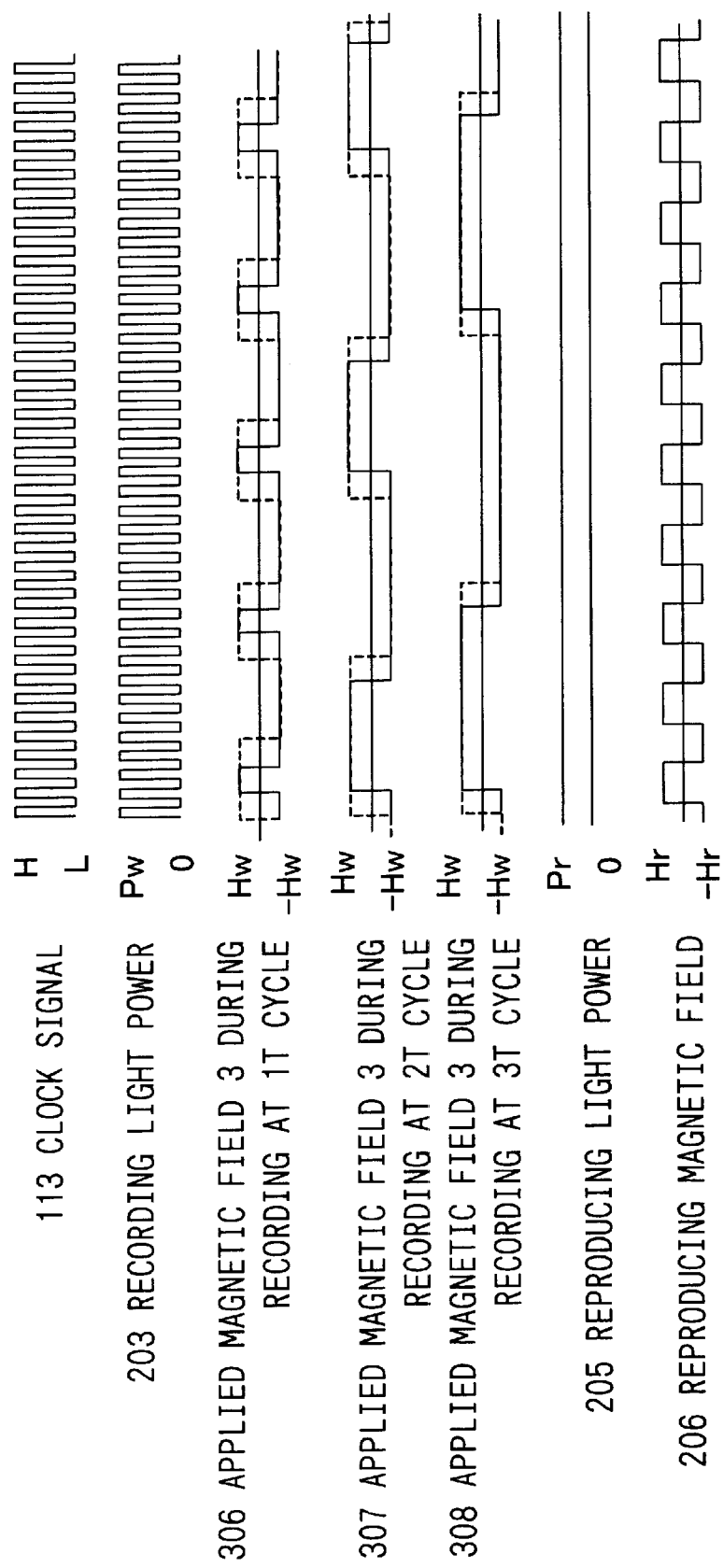

Fig. 9B

| | Hr | | | | |
|---|---|---|---|---|---|
| | 200 | 300 | 400 | 500 | 600 |
| 3.0 | | | | | |
| 2.9 | 2 | | | | |
| 2.8 | 2,3 | | | | |
| 2.7 | 2,3 | | | | |
| 2.6 | 2,3 | 2,3 | | | |
| Pr(mW) 2.5 | 2,3 | 2,3 | | | |
| 2.4 | | 2,3 | | | |
| 2.3 | | 2 | | 2 | 3 |
| 2.2 | | 2 | 2,3 | 2,3 | 2,3 |
| 2.1 | | | 2,3 | 2,3 | 2 |
| 2.0 | | | 2,3 | 2,3 | |

Fig. 10B

| | Hr | | | | |
|---|---|---|---|---|---|
| | 200 | 300 | 400 | 500 | 600 |
| Pr(mW) 3.0 | | | | | |
| 2.9 | 1,2 | | | | |
| 2.8 | 1,2,3 | | | | |
| 2.7 | 1,2,3 | | | | |
| 2.6 | 1,2,3 | 2,3 | | | |
| 2.5 | 2,3 | 1,2,3 | | | |
| 2.4 | | 1,2,3 | | | |
| 2.3 | | 1,2 | 1 | 1,2 | 3 |
| 2.2 | | 2 | 1,2,3 | 1,2,3 | 1,2,3 |
| 2.1 | | | 1,2,3 | 1,2,3 | 1,2 |
| 2.0 | | | 2,3 | 2,3 | |

METHOD FOR RECORDING MARK LENGTH SHORTER THAN CHANNEL BIT LENGTH ON MAGNETO-OPTICAL MEDIUM

BACKGROUND OF THE INVENTION

1. Field of the Invention

The present invention relates to a recording method, a recording and reproducing method, and a reproducing method for optical information for recording and reproducing the information on an optical recording medium by using a laser beam. The present invention also relates to an apparatus for carrying out the foregoing methods.

2. Description of the Related Art

The apparatus for recording and reproducing optical information is used such that an information mark is recorded on an information track of an optical recording medium by using a laser beam, and information is reproduced by detecting an optical change depending on the presence or absence of the information mark. Such an apparatus includes a focusing lens which is used to collect the laser beam onto the optical recording medium. The minimum diameter of a light spot formed on the optical recording medium is substantially represented by $\lambda/NA$ on the basis of the wavelength $\lambda$ of the laser beam and the numerical aperture NA of the focusing lens. In order to improve the recording density of the optical recording medium, it is necessary to decrease the arrangement interval (mark pitch) of information marks in the scanning direction of the light spot and the track interval (track pitch) for recording the information marks.

However, if the mark pitch and the track pitch are smaller than the light spot diameter, the following problem arises. That is, when one information mark is irradiated with the light spot, then a part of another information mark disposed therearound is simultaneously irradiated with the light spot, and a signal of the information mark to be reproduced is contaminated with any signal of the information mark disposed therearound. The contamination behaves as a noise component to cause interference, and the accuracy of reproduction is lowered. As described above, the contamination of the signal of the surrounding information mark greatly obstructs the realization of high density in the case of the system provided with the focusing lens and the laser having a specified wavelength.

The magnetic amplifying magneto-optical system (hereinafter referred to as "MAMMOS") is known as a technique which makes it possible to solve the problem as described above (Japanese Patent Application Laid-Open No. 8-2350, WO98/02877, and WO98/02878). When MAMMOS is used, a minute magnetic domain, which is transferred from a recording layer to a reproducing layer, can be magnified by using a reproducing magnetic field to have a spot size of a reproducing light beam. Therefore, it is possible to remarkably increase the reproduced signal intensity. The magnified magnetic domain can be instantaneously erased after the reproduction. Therefore, the crosstalk is avoided. That is, in the case of MAMMOS, it is possible to greatly improve the reproduced signal intensity and S/N even when the mark pitch and the track pitch are decreased.

Japanese Patent Application Laid-Open No. 10-92036 describes a system which resides in a recording and reproducing method based on a principle different from that of MAMMOS. In this system, no magnetic field is applied during reproduction. The temperature gradient, which is generated by radiating a light beam for the magnetic domain included in a magnetic recording medium, is used to move the magnetic wall of a recording mark in a reproducing layer without changing the recording data in a recording layer so that the recording mark, which has a size of not more than a diffraction limit of the light beam, is reproduced. This reproducing method involves the following problem. That is, the movement timing is discrepant between the process of magnetic wall movement in the direction to magnify the recording mark and the process of magnetic wall movement in the direction to reduce the recording mark. As a result, the period of time corresponding to the recording mark is always detected as a period of time which is shorter by a certain period of time. In this method, in order to deal with this problem, the recording mark is formed (recorded) to have a length which is longer than ordinary one.

Japanese Patent Application Laid-Open Nos. 63-281229 and 4-265522 disclose a technique in which the edge position of the recording mark is corrected. The problem, i.e., the edge position of the mark is deviated from the position at which the recording is essentially performed, is solved by correcting the recording laser beam pulse in conformity with the mark length. However, in the case of the technique described in these patent documents, when a mark of nT is recorded, the mark length formed on the recording medium is still nT. There is no disclosure of the method of the present invention in which a recording mark shorter than nT is recorded for a recording signal corresponding n clocks.

As described above, MAMMOS is an extremely effective method to remarkably improve the recording density. However, according to an experiment performed by the present inventors, it has been revealed that when information is intended to be reproduced by using MAMMOS, the optimum values of the light power and the magnetic field intensity to be applied during reproduction of information differ depending on the mark length of a recorded mark. For this reason, it has been difficult in some cases to reliably reproduce pieces of data recorded as mark arrays including several types of marks having different lengths respectively. This problem will be explained below.

When the recording and the reproduction based on MAMMOS were evaluated, a laser having a wavelength $\lambda=680$ nm and a focusing lens having an NA=0.55 were used, in which the NRZ modulation was applied with a channel bit length T=0.4 $\mu$m. The channel bit length herein means the length on the recording medium corresponding to the unit bit of the modulated data array. In the following description, the recording mark length is varied to use three types of 1T, 2T, and 3T. If the mark length is longer than the spot diameter (=$\lambda/NA$=1.24 $\mu$m), the difference disappears concerning the characteristic when the reproduction is performed on the basis of MAMMOS. Therefore, explanation will be omitted for mark lengths of not less than 4T. Those having been known as the recording system for the magneto-optical recording medium include, for example, the optical modulation system, the magnetic field modulation system, and the optical magnetic field modulation system. In the experiment described below, the optical magnetic field modulation system was selected, in which the minute mark can be accurately formed.

As shown in FIG. 7A, the recording light power 203 was modulated at a constant cycle during the recording in accordance with the optical magnetic field modulation system, while the magnetic field of +Hw synchronized with the cycle was applied for a period of nT to record a mark having a length of nT (n is a natural number). For example, when it is intended to successively record a cycle of 1T mark and 1T gap, the magnetic field is an applied magnetic field 300 during recording at 1T cycle as shown in the drawing. When it is intended to successively record a cycle of 2T mark and 2T gap, the magnetic field to be applied during recording is an applied magnetic field 301 during recording at 2T cycle as shown in the drawing. When it is intended to successively record a cycle of 3T mark and 3T gap, the magnetic field to be applied during recording is an applied magnetic field 302 during recording at 3T cycle as shown in the drawing. The modulation of the light power and the waveform used when the magnetic field is applied are generated on the basis of a clock signal 113. The clock signal 113 is generated by a conventional synchronized signal-generating circuit (PLL) for outputting a signal synchronized with clock pits previously formed on the recording medium.

For example, 1 cycle of the clock signal 113 generated in this experiment corresponds to 0.1 μm. Therefore, the following procedure is preferably adopted. That is, when a mark having a length of 1T(=0.4 μm) is recorded, the applied magnetic field is +Hw for a period of four cycles of the clock signal. When it is intended to provide a gap having a length of 1T(=0.4 μm), the applied magnetic field is -Hw for a period of four cycles of the clock signal. Similarly, when a mark having a length of 2T(=0.8 μm) is recorded, the applied magnetic field is +Hw for a period of eight cycles of the clock signal. When a mark having a length of 3T(=1.2 μm) is recorded, the applied magnetic field is +Hw for a period of twelve cycles of the clock signal. When it is intended to provide a gap having a length of 2T (=0.8 μm), the applied magnetic field is Hw for a period of eight cycles of the clock signal. When it is intended to provide a gap having a length of 3T(=1.2 μm), the applied magnetic field is -Hw for a period of twelve cycles of the clock signal.

During the reproduction, the reproducing light power 205 having a constant value Pr as shown in FIG. 6 is radiated onto the magnetic recording medium recorded with a group of recording marks 201. Further, the reproducing magnetic field 206 having a magnetic field intensity of ±Hr synchronized with the clock signal 113 is applied. Thus, the reproduced signal 104 can be obtained. However, if the reproducing light power 205 is smaller than Pr which is the optimum value, or if the reproducing magnetic field 206 is smaller than Hr which is the optimum value, then any error arises in the reproduced signal. For example, erroneous reproduced signals 104-1 to 104-3 as shown in FIG. 6 are obtained. On the other hand, if the reproducing light power 205 is larger than Pr which is the optimum value, or if the reproducing magnetic field 206 is larger than Hr which is the optimum value, then any error arises in the reproduced signal in the same manner as described above. For example, erroneous reproduced signals 104-4 to 104-6 as shown in FIG. 6 are obtained.

FIG. 7B shows a result of investigation on the combination of the reproducing light power 205 and the reproducing magnetic field 206 capable of obtaining the reproduced signal involving no error as in the reproduced signal 104. When the cycle of 1T mark and 1T gap was successively recorded, Pr and Hr capable of obtaining the reproduced signal involving no error resided in the combinations indicated by "1"in FIG. 7. Similarly, when the cycle of 2T mark and 2T gap was successively recorded, and when the cycle of 3T mark and 3T gap was successively recorded, then Pr and Hr capable of obtaining the reproduced signal involving no error resided in the combinations indicated by "2"and "3"respectively. According to this result, it is understood that Pr and Hr capable of obtaining the reproduced signal involving no error reside in the function of the mark length.

The data of a user is recorded as a mark array composed of marks having several types of lengths. Therefore, it is necessary to select the combination of Pr and Hr so that the reproduced signal involving no error may be obtained stably for the marks having all of the lengths. However, as clarified by FIG. 7B, Pr and Hr, which are able to correspond to all of the mark lengths, are not present. In this situation as it is, a problem arises in that it is impossible to ensure the reliability during the reproduction.

Japanese Patent Application Laid-Open Nos. 63-281229, 4-265522, and 10-92036 neither disclose nor suggest the problem as described above and any means for solving the problem.

SUMMARY OF THE INVENTION

The present invention has been made in order to solve the problem as described above, an object of which is provide a recording method, a reproducing method, and a reproducing apparatus for an optical recording medium, which make it possible to always reproduce data in a stable manner irrelevant to the length of a recording mark represented by a number of clocks (integral multiple of nT).

According to a first aspect of the present invention, there is provided a recording method on an optical recording medium for recording, as information, recording marks having a variety of lengths on the basis of a clock, on the optical recording medium including at least a recording layer, the method comprising forming a recording mark having a length shorter than nT (T is a channel bit length)on the optical recording medium as a recording signal corresponding to an amount of n clocks (n is an integer). The recording signal, which corresponds to the amount of n clocks (n is an integer), is converted into a recording signal shorter than the original recording signal. The recording mark, which has the length shorter than nT, can be formed on the optical recording medium on the basis of the recording signal after being converted.

The principle of the present invention will be explained with reference to FIG. 5, as compared with the conventional recording method. A magneto-optical recording medium is used as the recording medium. The optical magnetic field modulation system is adopted, in which a magnetic field modulated on the basis of the recording signal is applied, while radiating a pulse beam having a constant cycle is radiated onto the magneto-optical recording medium. The NRZ modulation is used for the modulation system for the recording code.

As shown in FIG. 5, when the mark having the length of nT is recorded in accordance with the conventional system, then the recording magnetic field 211 is +Hw for a period of time of nT, and the recording magnetic field is -Hw in regions in which the recording mark is not recorded. However, as described above, the reproducing power Pr and the applied magnetic field Hr, which are capable of corresponding to all of the mark lengths, are not present in the case of the conventional recording system. Therefore, it is impossible to ensure the reliability during the reproduction. On the other hand, in the case of the recording system according to the present invention, the mark length correction amount Lc is provided for each mark length as shown in FIG. 5 so that the mark length is shortened. For example, it is assumed that the correction amount for the 1T mark is Lc1, the correction amount for the 2T mark is Lc2, and the correction amount for the 3T mark is Lc3. On this assumption, when the 1T mark is recorded in accordance with the system of the present invention, then the recording magnetic field 204 is +Hw for a period of time of 1T'(=1T+ 2Lc1), and the recording magnetic field is −Hw in the regions in which the mark is not recorded. That is, the 1T mark is recorded not as a mark having a length of 1T but as a mark having a length of 1T'. The broken line concerning the recording magnetic field 204 indicates the conventional recording waveform. Similarly, the 2T mark and the 3T mark to be recorded are recorded as marks having lengths of 2T' and 3T' respectively, in which there are given 2T'=2T+ 2Lc2 and 3T'=3T+2Lc3. Marks having lengths of not less than 4T are subjected to the correction for the mark length exactly in the same manner as described above. Whether the mark length correction amount Lcn corresponding to a mark having a length of nT has a positive, zero, or negative value changes depending on, for example, the characteristic and the structure of the medium, the reproducing power, and the applied magnetic field. However, the mark length correction amount Lcn has a value which is not zero for at least one n.

Explanation will be made with reference to FIGS. 8A and 8B for the effect obtained by recording the mark having each mark length nT as the mark having the mark length nT' corrected by using the mark length correction amount Lc prescribed for each mark length when information is recorded in accordance with the present invention. FIG. 8A shows the same recording and reproducing conditions as those shown in FIG. 7A except that an identical mark length correction amount Lc=−0.1 μm was added to each mark length. FIG. 8B shows, for each mark length, the relationship between the reproducing power Pr and the applied magnetic field Hr to obtain the good reproduced signal under the conditions shown in FIG. 8A. However, the intensity Pw of the recording light power 203 and the intensity Hw of the recording magnetic field after correction are designed so as to obtain the largest number of combinations of the reproducing light power 205 and the reproducing magnetic field 206 with which the reproduction can be performed without any error to reproduce the cycle pattern of the 1T mark and the 1T gap recorded by using the conventional recording magnetic field 211 (see FIG. 5). Since there is given Lc=−0.1 μm, the substantial mark length of 1T is 0.2 μm, the substantial mark length of 2T is 0.6 μm, and the substantial mark length of 3T is 1 μm. When FIG. 7B is compared with FIG. 8B, it is understood concerning each mark length that the combination of Pr and Hr, with which the reproduction can be performed without any error, is increased when Lc=−0.1 μm is added, probably because of the following reason. That is, when the mark length of the recording mark is shortened, the leak magnetic field, which is brought about by another recording mark which adjoins with the gap intervening therebetween, is decreased. As a result, the error of the reproduced signal from the recording mark to be reproduced is reduced. However, the combination of Pr and Hr capable of corresponding to all of the mark lengths is not present, in the same manner as in the case in which Lc is not added.

FIGS. 9A and 9B show recording and reproducing conditions and results of measurement obtained when an identical mark length correction amount Lc=−0.2 μm was added to each mark length. Pw and Hw are the same as those shown in FIG. 8A. Since there is given Lc=−0.2 μm, the substantial mark length of 1T is 0.1 μm, the substantial mark length of 2T is 0.5 μm, and the substantial mark length of 3T is 0.9 μm. Concerning the mark lengths of 2T and 3T, the combination of Pr and Hr, with which the reproduced signal involving no error is obtained, is increased when Lc=−0.2 μm is added. However, concerning the mark length of 1T, the combination of Pr and Hr capable of performing reproduction without any error is not present.

According to the results described above, the following fact is comprehensible. That is, concerning the mark of the length of not less than 2T, the combination of Pr and Hr, with which the reproduced signal involving no error is obtained, is increased in the case of Lc=−0.1 μm. As for the mark of the length of 1T, the combination of Pr and Hr, with which the reproduced signal involving no error is obtained, is increased in the case of Lc=−0.2 μm. Therefore, it is preferable that the mark length correction amount Lc is changed depending on the length of the mark when the mark is subjected to the recording. FIGS. 10A and 10B show recording and reproducing conditions in which Lc=−0.1 μm was added when the mark of the length of 1T was recorded, and Lc=−0.2 μm was added when the mark of the length of not less than 2T was recorded. FIGS. 10A and 10B also show results of measurement, for each mark length, of the relationship between the reproducing power Pr and the applied magnetic field Hr with which the reproduced signal involving no error is obtained. Although the combination of Pr and Hr capable of corresponding to all of the mark lengths is not present at all in the results shown in FIGS. 7B, 8B, and 9B, it is understood that a plurality of such combinations are present in the results shown in FIG. 10B. The reason of the foregoing results is considered as follows. That is, the leakage occurs from another recording mark which adjoins the recording mark to be reproduced, with the gap intervening therebetween. The longer the mark length of the another recording mark is, the larger the leak magnetic field is. Therefore, when the recording is performed by increasing the mark length correction amount Lc in accordance with the increase in the length of the recording mark, it is possible to decrease the leak magnetic field which is exerted on the concerning recording mark by the another recording mark adjacent to the concerning recording mark to be recorded. Accordingly, it is possible to reduce the error of the reproduced signal obtained from the concerning recording mark.

As described above, in the case of the use of the information-recording and reproducing system according to the present invention in which the mark length correction amount Lc is changed depending on the length of the mark when the mark is subjected to the recording, it is possible to select the combination of Pr and Hr with which the reproduced signal involving no error is obtained for the marks of all of the lengths. As a result, it is possible to sufficiently ensure the reliability during the reproduction.

In the method of the present invention, the reproduction can be performed for the marks of all of the lengths under an identical reproducing condition provided that there is at least one combination of Pr and Hr with which the reproduced signal involving no error is obtained for the marks of all of the lengths. Further, the margin for the reproducing condition is widened when appropriate Lc is selected depending on n so that the number of combinations is maximized.

The foregoing results are obtained under the condition in which the recording parameters Pw and Hw have been already determined. However, when Pw and Hw are not optimized, the following procedure is available. That is, optimum Lc's are determined for the respective mark lengths in the same manner as described above respectively, while successively changing Pw and Hw at certain prescribed intervals starting from a preset initial value to adopt Pw and Hw with which the number of combinations of Pr and Hr capable of obtaining the reproduced signal involving no error is maximized.

According to the recording method of the present invention, the margin is widened concerning the reproducing magnetic field intensity and the reproducing light beam intensity to reliable perform the reproduction for a variety of mark lengths. Therefore, it is effective to apply the present invention to the optical recording medium of the type in which the light and the magnetic field are applied during the reproduction, for example, the magneto-optical recording medium. Especially, it is more effective to apply the present invention to a magneto-optical recording medium comprising a magnetic recording layer and a reproducing layer, in which a recording mark recorded in the magnetic recording layer is transferred in a magnified form to the reproducing layer by radiating a light spot and applying a magnetic field during reproduction. The present invention is also effective with respect to the magneto-optical recording medium to perform reproduction based on the magnetically induced super resolution (MSR).

According to a second aspect of the present invention, there is provided a reproducing method for reproducing information recorded on an optical recording medium including recording marks having a variety of lengths formed thereon on the basis of a clock, the method comprising using the optical recording medium on which a recording mark having a length shorter than nT is formed (T is a channel bit length) as a recording signal corresponding to an amount of n clocks (n is an integer), and reproducing the information in synchronization with the clock while radiating a reproducing light beam.

In the reproducing method described above, it is possible to perform the reproduction with a wide reproducing margin in a reliable manner on the optical recording medium, preferably on a magneto-optical recording medium subjected to the recording with a variety of mark lengths in accordance with the first aspect. The reproducing method is especially preferred when the optical recording medium is a magneto-optical recording medium comprising a magnetic recording layer and a reproducing layer, in which a recording mark recorded in the magnetic recording layer is transferred in a magnified form to the reproducing layer by radiating a light spot and applying a magnetic field during the reproduction. In this case, it is possible to ensure the sufficient power margin for the reproducing light beam and the reproducing magnetic field, and it is possible to reproduce the recording marks having the variety of lengths at high C/N.

According to a third aspect of the present invention, there is provided a recording apparatus for an optical recording medium, comprising:

a clock-generating circuit;

a recording length-correcting circuit for correcting a recording signal length so that a recording signal corresponding to an amount of n clocks (n is an integer) is formed as a recording mark having a length shorter than nT (T is a channel bit length) on the optical recording medium; and an applying unit for modulating and applying at least one of a light beam and a magnetic field to the optical recording medium on the basis of an output from the recording length-correcting circuit.

The recording length-correcting circuit of the recording apparatus of the present invention corrects the mark length nT with a mark length correction amount Lc. The recording length-correcting circuit may include a mark length-correcting circuit for converting a code length corresponding to a mark length into a code length shorter than the above. The mark length-correcting circuit may include a code conversion table to shorten the mark length.

The mark length-correcting circuit may be operated such that the shortness of the recording mark for nT is allowed to differ depending on n. Accordingly, any mark having different n can be subjected to the reproduction without changing the reproducing condition (for example, the reproducing light beam intensity and the reproducing magnetic field intensity). The recording length-correcting circuit may further includes an address retrieval memory, a mark length-identifying circuit, and a memory for storing a mark length obtained by being corrected by the mark length-correcting circuit.

The recording apparatus may further comprise a data modulator, a data demodulator, and a detector for detecting a reflected light beam from the optical recording medium, thereby making it possible to reproduce the information. In other words, the recording apparatus of the present invention may function as a recording and reproducing apparatus. In this arrangement, a magnetic field-applying unit may be used to apply a reproducing magnetic field to the optical recording medium when the information is reproduced. The data demodulator may be used so that the recording mark having the length shorter than nT recorded on the optical recording medium is demodulated to produce the signal corresponding to the amount of n clocks.

BRIEF DESCRIPTION OF THE DRAWINGS

FIG. 6 shows a condition for performing reproduction on the magneto-optical recording medium subjected to recording in accordance with the conventional optical magnetic field modulation system, and a timing chart illustrating various reproduced signals.

FIG. 7A shows a timing chart illustrating the recording condition used to perform recording on the magneto-optical recording medium in accordance with the conventional optical magnetic field modulation system, and FIG. 7B shows a table illustrating the relationship between the optimum reproducing power and the optimum reproducing magnetic field for the recording mark recorded under various conditions.

FIG. 8A shows a timing chart illustrating the recording and reproducing condition used when a certain mark length correction value is added in accordance with the present invention, and FIG. 8B shows a table illustrating the relationship between the optimum reproducing power and the optimum reproducing magnetic field for the magneto-optical recording medium recorded with recording marks having various mark lengths under the condition shown in FIG. 8A.

FIG. 9A shows a timing chart illustrating the recording and reproducing condition used when a certain mark length correction value is added in accordance with the present invention, and FIG. 9B shows a table illustrating the relationship between the optimum reproducing power and the optimum reproducing magnetic field for the magneto-optical recording medium recorded with recording marks having various mark lengths under the condition shown in FIG. 9A.

FIG. 10B shows a table illustrating the relationship between the optimum reproducing power and the optimum reproducing magnetic field for the magneto-optical recording medium recorded with recording marks having various mark lengths under the condition shown in FIG. 10A.

DESCRIPTION OF THE PREFERRED EMBODIMENTS

First Embodiment

The optical information-recording and reproducing method and the optical information-recording and reproducing apparatus according to the present invention will be explained in further detail below in accordance with embodiments with reference to the drawings.

Structure of Optical Information-recording and Reproducing Apparatus

Figure 1:
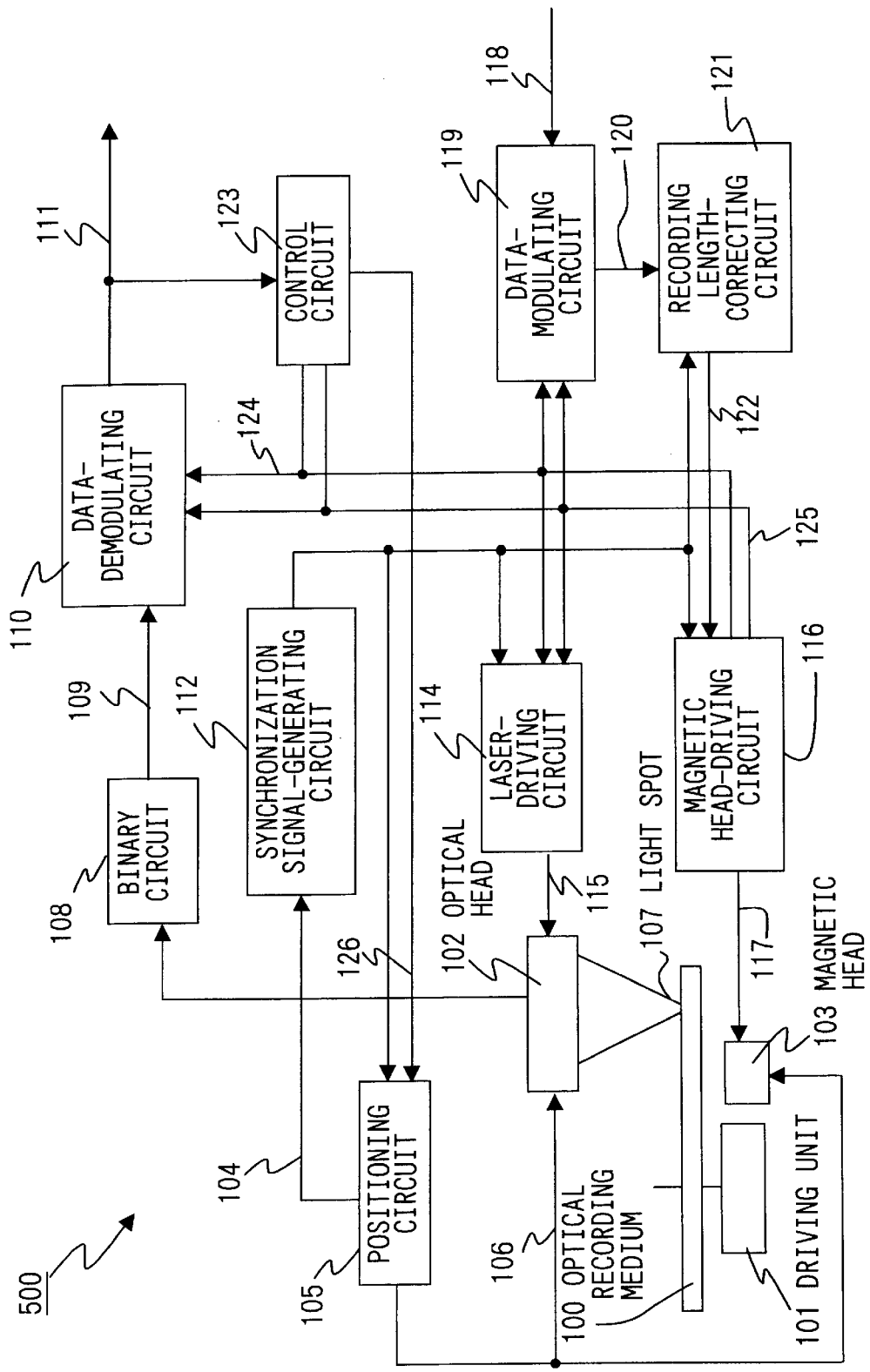
FIG. 1 shows a schematic arrangement illustrating an embodiment of the information-recording and reproducing apparatus according to the present invention.

An optical information-recording and reproducing apparatus 500 shown in FIG. 1 comprises a driving unit 101 for carrying and rotating an optical recording medium 100, an optical head 102 for radiating a light spot 107 onto the optical recording medium 100 when information is recorded or when recorded information is reproduced, and a magnetic head 103 for applying a magnetic field onto the optical recording medium 100 when information is recorded or when recorded information is reproduced. The optical recording medium 100 is a magneto-optical disk including clock pits for generating a clock signal 113 and address pits for representing positions on the disk of areas for storing information, the clock pits and the address pits being previously formed. The magnetic disk may be a magneto-optical disk comprising a recording layer and a reproducing layer provided on a substrate on which reproduction can be performed in accordance with MAMMOS. Such a disk is disclosed in WO98/02877 and WO98/02878. These documents are incorporated herein by reference.

The optical information-recording and reproducing apparatus 500 further comprises a positioning circuit 105, a synchronization signal-generating circuit 112, a data-modulating circuit 119, a recording length-correcting circuit 121, a magnetic head-driving circuit 116, a laser-driving circuit 114, a binary circuit 108, a data-demodulating circuit 110, and a control circuit 123 for controlling these circuits.

The positioning circuit 105 executes the positioning of the laser beam radiated by the optical head 102 at the light spot 107 formed on the optical recording medium 100, and the positioning of the magnetic head 103. The synchronization signal-generating circuit 112 generates the clock signal 113 synchronized with the rotation of the optical recording medium 100 on the basis of a reproduced signal 104 obtained when the track is scanned across the light spot 107. The data-modulating circuit 119 modulates user data 118 to be recorded during the recording process in accordance with a previously determined modulation system to output modulated data. The recording length-correcting circuit 121 corrects the code length on the basis of a coded signal 120 outputted from the data-modulating circuit 119 during the recording process.

The magnetic head-driving circuit 116 drives the magnetic head 103 by generating an applying magnetic field control signal 117 on the basis of the clock signal 113 and a recording signal 122 outputted from the recording length-correcting circuit 121 during the recording, and generating an unillustrated reproducing clock and the applying magnetic field control signal 117 on the basis of the clock signal 113 during the reproduction. The laser-driving circuit 114 drives the optical head 102 by generating a light intensity-modulating signal 115 to be outputted to the optical head 102 on the basis of the clock signal 113 during the recording, and generating the light intensity-modulating signal 115 so that a constant light power is outputted from the optical head 102 during the reproduction. The binary circuit 108 is used to obtain a binary value of the reproduced signal 104 detected by scanning the track across the light spot 101 during the reproduction. The data-demodulating circuit 110 applies the demodulation processing and the correction of error to output reproduced data 111 on the basis of a binary signal 109 outputted from the binary circuit 108.

Recording Length-correcting Circuit

Figures 2, 3:
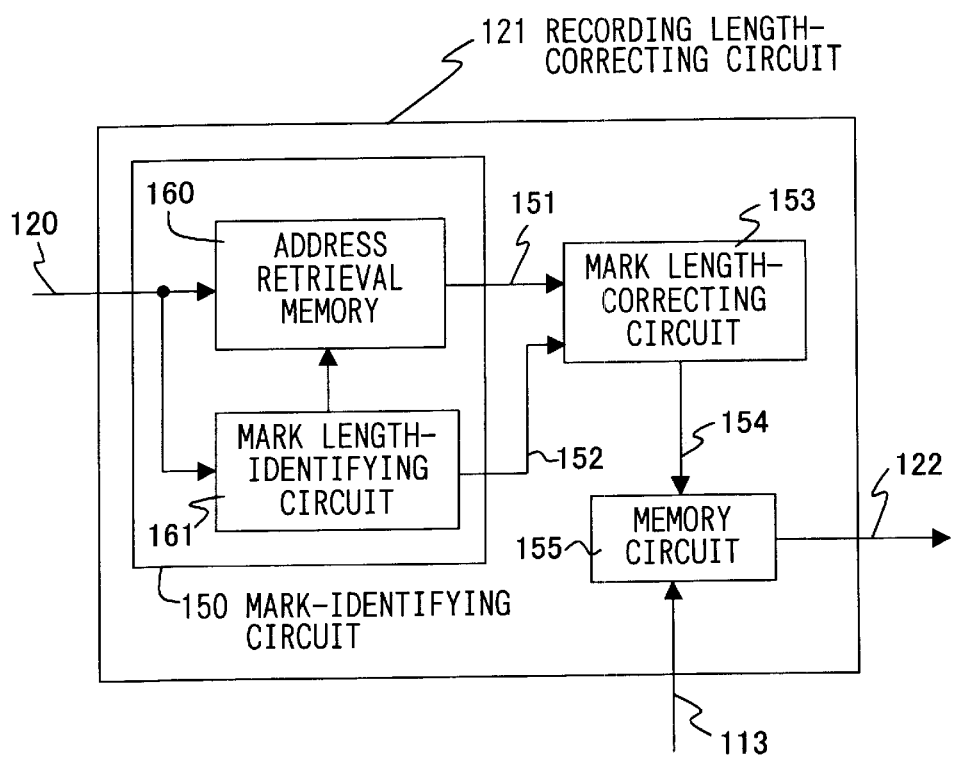
FIG. 2 shows an embodiment of a recording length-correcting circuit which constitutes the information-recording and reproducing apparatus according to the present invention.
FIG. 3 shows an embodiment of a mark length-correcting circuit which constitutes the information-recording and reproducing apparatus according to the present invention.

The recording length-correcting circuit 121 will be explained with reference to FIG. 2. As shown in FIG. 2, the recording length-correcting circuit 121 comprises a mark-identifying circuit 150, a mark length-correcting circuit 153, and a memory circuit 155. The mark-identifying circuit 150 includes an address retrieval memory 160 and a mark length-identifying circuit 161. The address retrieval memory 160 has a retrieval mode and a hold mode. In the retrieval mode, the address retrieval memory 160 stores an address at which the code '1' firstly appears after the retrieval for the coded signal 120 is started. The address indicates the number of the position of the detected code '1' as counted from the head of the coded signal 120. Simultaneously with the storage of the address, the address retrieval memory 160 undergoes the change to the hold mode, and it does not store any address even when the next code '1' appears. The continuous length of continuous codes '1' contained in the coded signal 120 corresponds to the mark length. Therefore, the address retrieval memory 160 can be used to detect the head address of the mark.

On the other hand, the mark length-identifying circuit 161 counts the number of codes '1' contained in the coded signal 120 to identify the mark length. When the counting operation is completed, then the mark length-identifying circuit 161 outputs a pulse as a count end signal 162, and it outputs a result of the counting operation as a mark length signal 152. When the address retrieval memory 160 detects the pulse of the count end signal 162, it outputs the stored address as a mark head address 151. The address retrieval memory 160 undergoes the change to the retrieval mode again to retrieve the head address of the mark which appears in the next time. The mark length-identifying circuit 161 counts the length of the mark which appears in the next time.

The mark length-correcting circuit 153 includes a conversion table, for example, as shown in FIG. 3. If the mark length signal 152 is '1T' ('1111'), an array of '0110' after correction of the mark length is selected (conversion is performed into the array). Similarly, if the mark length signal 152 is '2T', an array of '00111100' is selected. If the mark length signal 152 is '3T', an array of '000111111000' is selected. The operation is performed in exactly the same manner as described above if the mark length signal 152 is larger than '3T', explanation of which will be omitted. As described above, the array after the correction of the mark length is obtained by previously correcting the array before the correction of the mark length by using the mark length correction amount determined for each mark length. In this embodiment, the same correction amount is used for 3T and 4T. However, there is no limitation thereto. Any different correction amount is available provided that the reproduction can be correctly performed during the reproduction process.

The memory circuit 155 has a storage capacity capable of storing the coded signal 120 to be inputted into the recording length-correcting circuit 121. Before the coded signal 120 is inputted, all of values in the memory circuit 155 are set to be '0'. In general, the coded signal 120 is sent as having a certain length. For example, the length is composed of sector length units to be subjected to the recording. The mark length-correcting circuit 153 writes the array after the correction of the mark length at a specified position in the memory circuit 155 on the basis of the mark head address 151 and the mark length signal 152.

Figure 4:
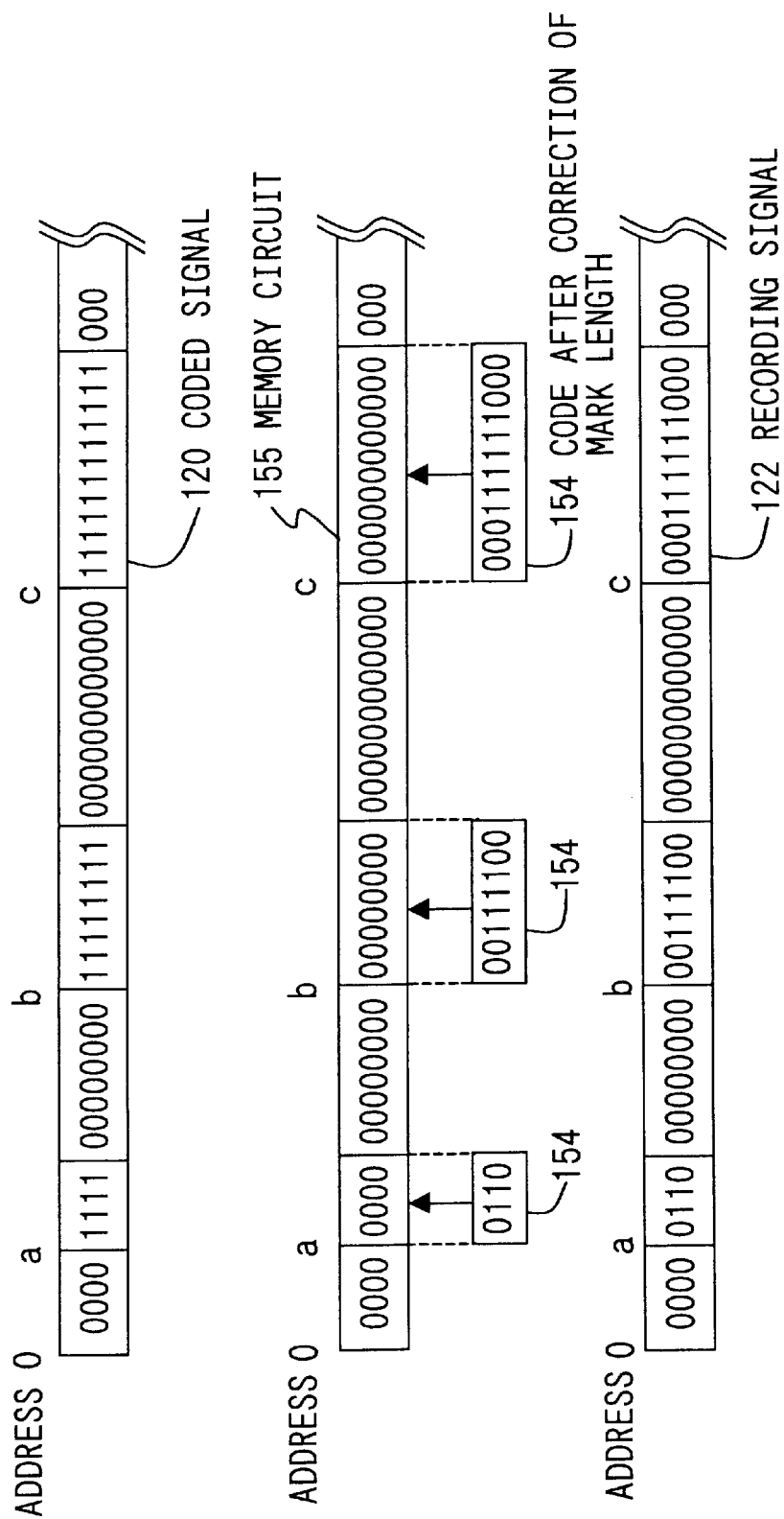
FIG. 4 shows the operation of the mark length-correcting circuit which constitutes the information-recording and reproducing apparatus according to the present invention.

As shown in FIG. 4, if the mark head address 151 is 'a', and the mark length signal 152 is '4'('1111'), then the mark length-correcting circuit 153 writes '0110'as a signal 154 after the correction of the mark length in an order starting from an address 'a' in the memory circuit 155. Similarly, if the mark head address 151 is 'b', and the mark length signal 152 is '8'('11111111'), then the mark length-correcting circuit 153 writes '00111100'as a signal 154 after the correction of the mark length in an order starting from an address 'b' in the memory circuit 155. If the mark head address 151 is 'c', and the mark length signal 152 is '12'('111111111111'), then the mark length-correcting circuit 153 writes '000111111000'as a signal 154 after the correction of the mark length in an order starting from an address 'c' in the memory circuit 155.

When the information is recorded, the recording signal 122 is outputted to the magnetic head-driving circuit in an order starting from the address '0', while synchronizing the array stored in the memory circuit 155 with the clock signal 113 generated by the synchronization signal-generating circuit 112.

Positioning of Light Spot and Magnetic Head

The positioning operation for the light spot and the magnetic head will be explained with reference to FIG. 1. When the information is recorded or reproduced, the control circuit 123 sends a positioning command signal 126 to the positioning circuit 105 so that the light spot 107 and the magnetic head 103 are positioned at an objective recording area. The positioning circuit 105 generates a target signal 106 on the basis of the positioning command signal 126 to position the optical head 102 and the magnetic head 103 at the objective recording area. During this process, the control circuit 123 also turns ON a reproduction command signal 125 to be outputted. The address, which is previously formed on the optical recording medium 100, is monitored on the basis of the reproduced data 111 sent from the data-demodulating circuit 110. When the control circuit 123 confirms, according to the address, the fact that the light spot 107 and the magnetic head 103 arrive at the objective position, the reproduction command signal 125 and the positioning command signal 126 are turned OFF.

Recording of Information

Figure 5:
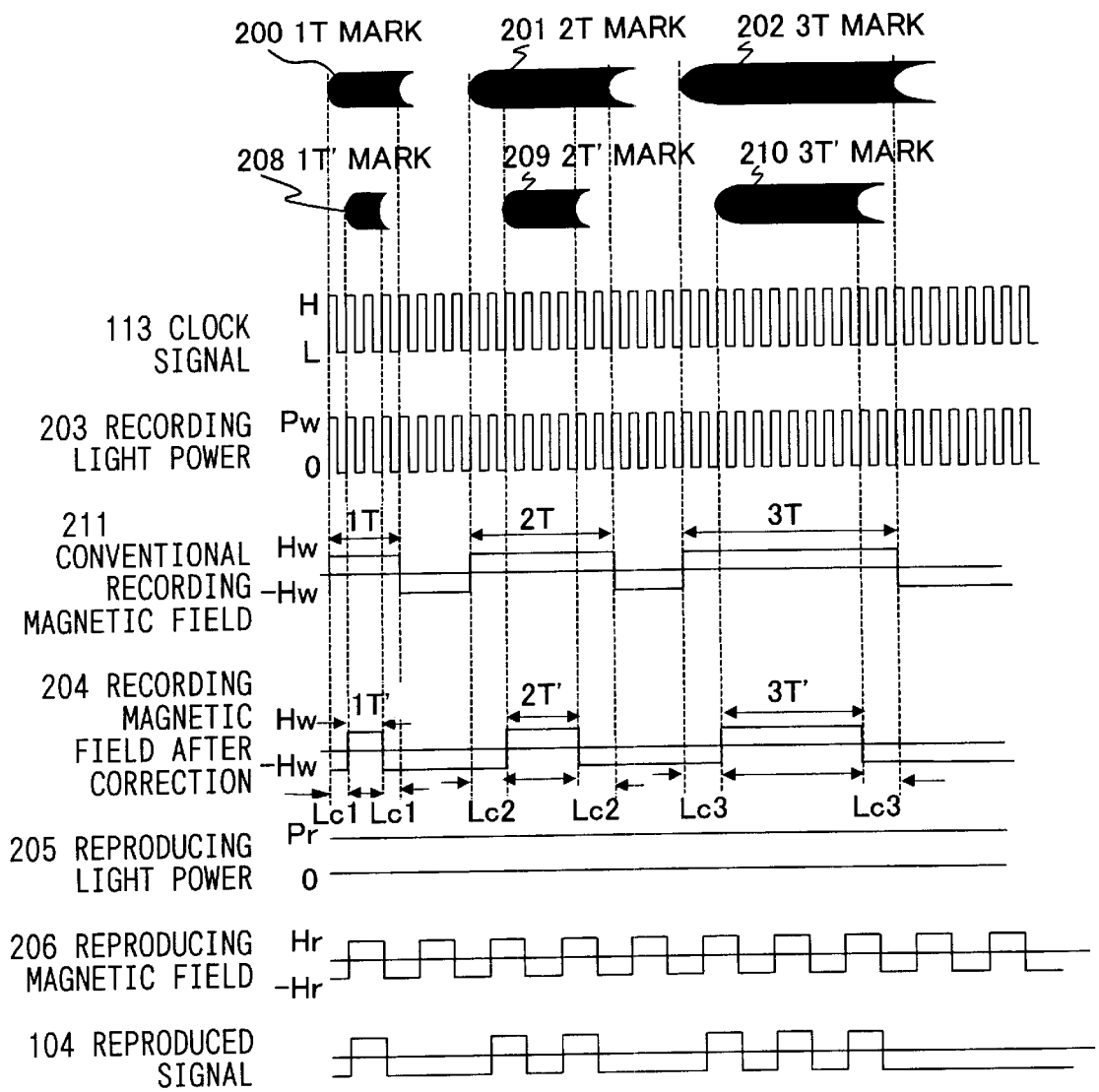
FIG. 5 shows a timing chart illustrating the situation in which information is recorded and reproduced by using the information-recording and reproducing apparatus according to the present invention.
Figure 10A:
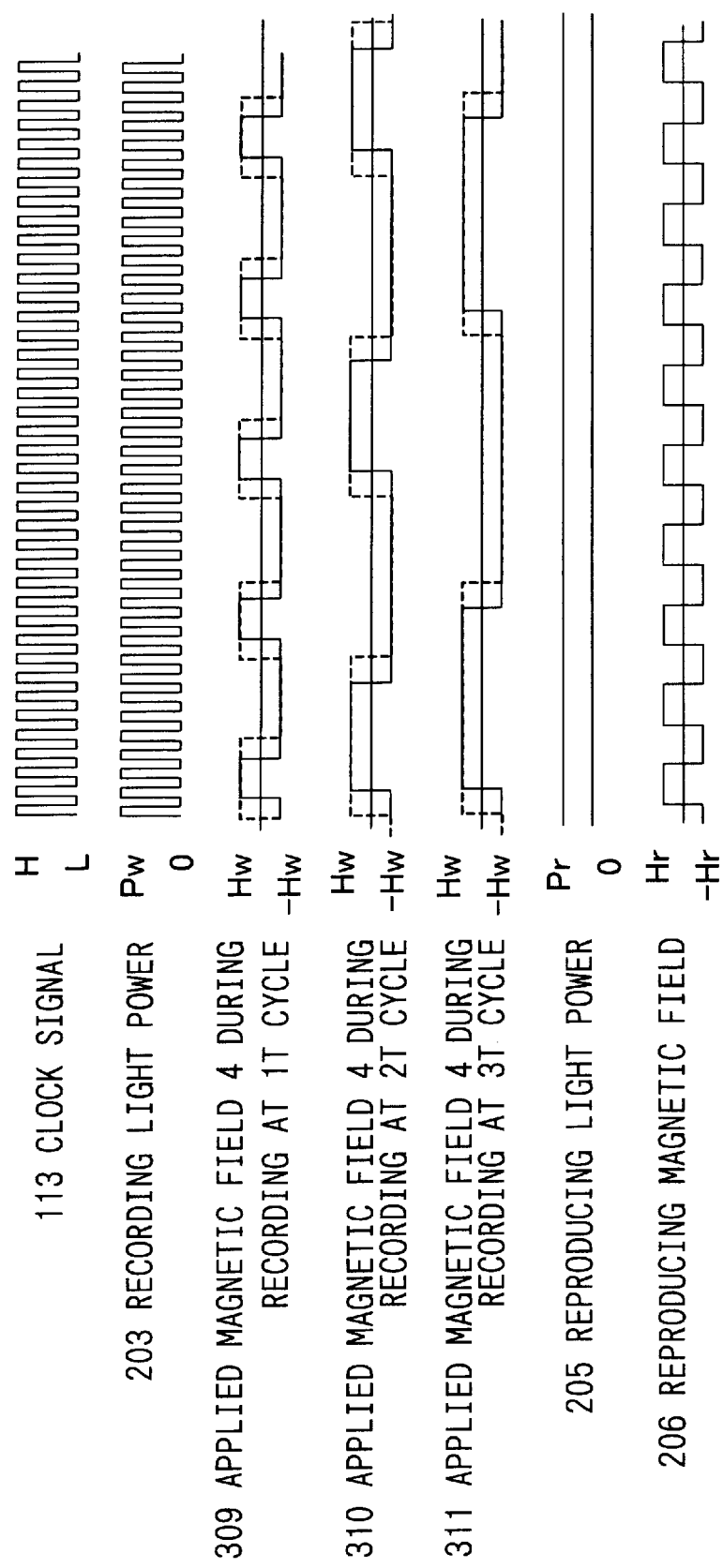
FIG. 10A shows a timing chart illustrating the recording and reproducing condition used when different mark length correction values are added to respective mark lengths in accordance with the present invention.

The operation for recording the information will be explained with reference to FIG. 1. When the positioning is completed for the light spot 107 and the magnetic head 103 by using the positioning circuit 105, the control circuit 123 turns ON and outputs a recording command signal 124. If the recording command signal 124 is turned ON, then the data-modulating circuit 119 modulates the user data 118 in accordance with the previously determined modulation system, and it outputs the coded signal 120 as a result thereof. If the coded signal 120 is inputted into the recording length-correcting circuit 121, the recording signal 122 having the recording length corrected as described in detail above is outputted. If the recording command signal 124 is turned ON, the magnetic head-driving circuit 116 outputs an applying magnetic field control signal 117 in which the recording signal 122 is synchronized with the clock signal 113. The magnetic head 103 generates, for example, a recording magnetic field 204 as shown in FIG. 5 in accordance with the applying magnetic field control signal 117. On the other hand, if the recording command signal 124 is turned ON, the laser-driving circuit 114 outputs the light intensity-modulating signal 115 synchronized with the clock signal 113. The optical head 102 generates, for example, a recording light power 203 as shown in FIG. 5 in accordance with the light intensity-modulating signal 115. Recording marks 208, 209, 210 as shown in FIG. 5 are recorded on the optical recording medium 100 in accordance with the recording light power 203 and the recording magnetic field 204. For the purpose of comparison, FIG. 5 shows the recording magnetic field 211 in which the mark length is not corrected, and recording marks 200, 201, 202 formed thereby.

Reproduction of Information

The operation for reproducing the information will be explained with reference to FIG. 1. When the positioning is completed for the light spot 107 and the magnetic head 103 by using the positioning circuit 105, the control circuit 123 turns ON and outputs a reproduction command signal 125. If the reproduction command signal 125 is turned ON, then the magnetic head-driving circuit 116 outputs an applying magnetic field control signal 117 synchronized with the reproducing clock based on the clock signal 113. The reproducing clock is designed such that the scanning direction of the light spot per 1 clock is T. The magnetic head 103 generates, for example, a reproducing magnetic field 206 as shown in FIG. 5 in accordance with the applying magnetic field control signal 117. On the other hand, if the reproduction command signal 125 is turned ON, the laser-driving circuit 114 outputs a light intensity modulating signal 115 having a constant value. The optical head 102 generates, for example, a reproducing light power 205 as shown in FIG. 5 in accordance with the light intensity modulating signal 115. The reproduced signal 104, which is inherent in MAMMOS, is generated by the aid of the reproducing light power 205 and the reproducing magnetic field 206. The reproduced signal 104 is converted to have a binary value by means of the binary circuit 108. If the reproduction command signal 125 is turned ON, the data-demodulating circuit 110 applies the demodulation processing and the error-correcting processing to the binary signal 109 to output the reproduced data 111.

The embodiment described above is illustrative of the case in which the optical magnetic field modulation system is adopted during the recording. However, the mark length correction recording according to the present invention can be also carried out by adopting the optical modulation system or the magnetic field modulation system.

Second Embodiment

Figure 11:
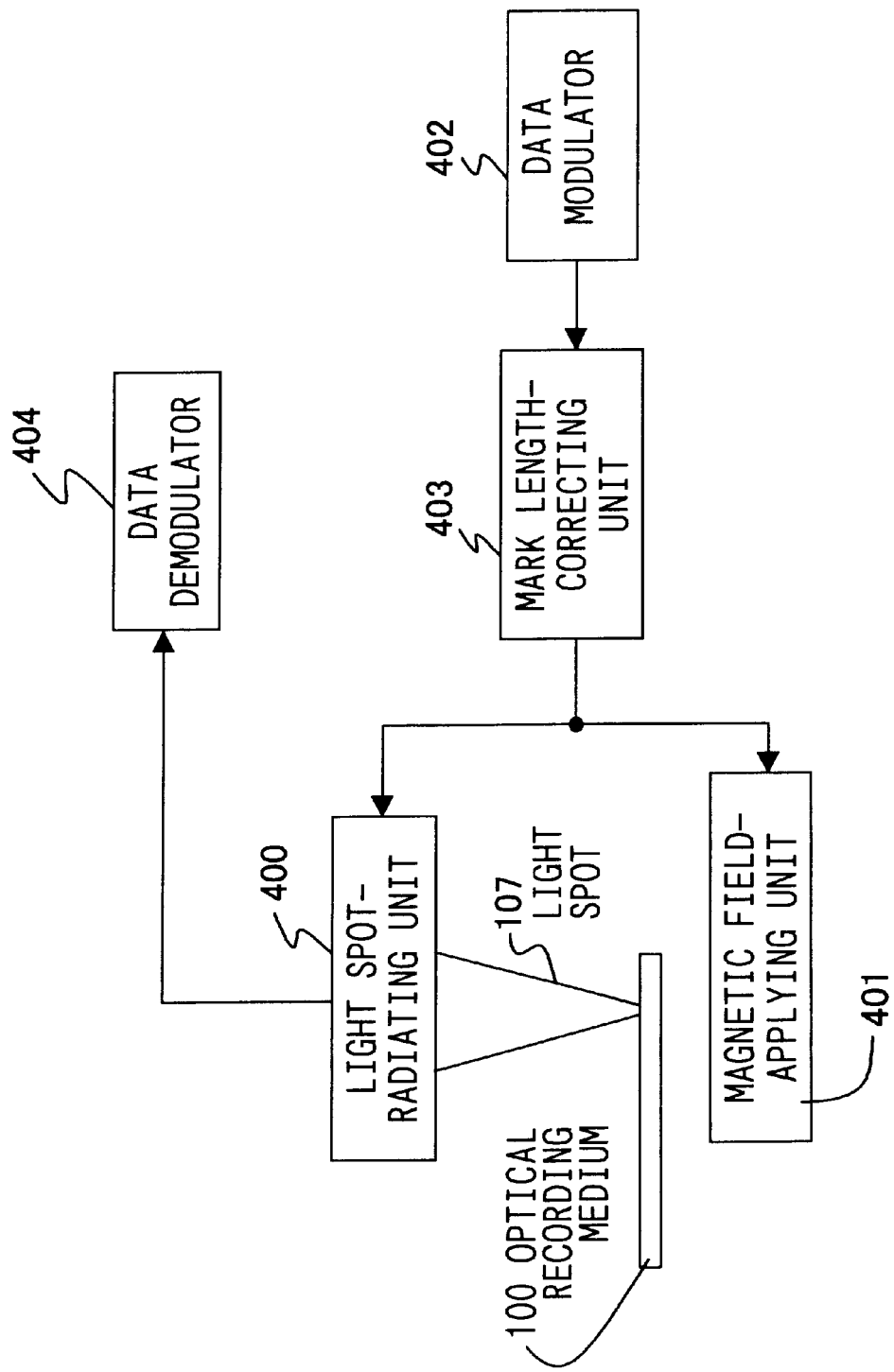
FIG. 11 shows a schematic arrangement illustrating an embodiment of an information-recording apparatus and an information-recording and reproducing apparatus according to the present invention.

FIG. 11 shows another embodiment of the information-recording apparatus and the information-recording and reproducing apparatus according to the present invention. An optical recording medium 100 is a magnetic disk on which marks having a variety of lengths are recorded, and reproduction can be performed in accordance with the MAMMOS system. The optical recording medium 100 comprises a recording layer in which data is recorded as marks represented by directions of magnetization, and a reproducing layer to which the mark recorded in the recording layer is magnified and transferred during reproduction by radiating a light spot and applying a magnetic field.

A light spot-radiating unit 400 is a means for radiating a light spot 107 onto the optical recording medium 100. The magnetic field-applying unit 401 is a device for applying the magnetic field to the optical recording medium 100. The magnetic field-applying unit 401 is also capable of applying a modulated magnetic field. The magnetic field-applying unit 401 applies the magnetic field during the recording and the reproduction, if necessary. An unillustrated mark-forming unit includes any one of or both of the light spot-radiating unit 400 and the magnetic field-applying unit 401. In the case of the optical modulation system in which it is unnecessary to apply any magnetic field during the recording, it is unnecessary for the mark-forming unit to possess the magnetic field-applying unit 401, and it is enough to use only the light spot-radiating unit 400. A data modulator 402 modulates data to be recorded on the basis of a predetermined modulation rule.

A mark length-correcting unit 403 is provided between the data modulator 402 and at least one of the light spot-radiating unit 400 and the magnetic field-applying unit 401. The mark length-correcting unit 403 deals with the mark detected during the reproduction as a mark in which the number of clocks corresponds to an amount of n clocks (n is at least one natural number), based on a reproducing clock in which the scanning distance of the light spot per 1 clock is T provided that the channel bit length is T. The mark length-correcting unit 403 corrects the mark so that the length of the mark, which is formed during the recording in the recording layer, becomes a length which is different from nT. In FIG. 11, the output of the mark length-correcting unit 403 is inputted into both of the light spot-radiating unit 400 and the magnetic field-applying unit 401. However, there is no limitation thereto. The connection may be made to at least one which relates to the correction of the mark length.

An unillustrated reflected light detector detects reflected light from the optical recording medium 100. The mark can be detected on the basis of an output from the reflected light detector. A data demodulator 404 demodulates the recorded data from a signal based on the mark which is detected by the reflected light detector during the reproduction. Upon the reproduction, the reproducing process is carried out in synchronization with a reproducing clock which is generated on the basis of a reproducing clock generator although not shown in FIG. 11. An unillustrated signal processing unit for performing necessary signal processing may be provided between the reflected light detector and the data demodulator 404.

In the embodiment described above, information is recorded by using the optical magnetic field modulation system. However, information can be also recorded by using the optical modulation system or the magnetic field modulation system. When the optical modulation system is used, a laser-driving circuit is controlled on the basis of a recording code which is corrected by the recording length-correcting circuit in accordance with the present invention to form a recording mark shorter than nT. When the optical modulation system is used, it is possible to use an optical recording medium disclosed, for example, in WO97/22969, WO97/03439, and WO98/09283. These documents are incorporated herein by reference.

In the embodiment described above, the recording code is subjected to the NRZ modulation. However, there is no limitation thereto. It is possible to use an arbitrary modulation system such as the 1–7 modulation and the 8/16 modulation.

In the embodiment described above, the clock signal (external clock), which is detected from the optical recording medium, is used for the recording clock and the reproducing clock. However, the recording apparatus itself may include a clock-generating circuit, and the process for correcting the mark length may be carried out on the basis of a clock (internal clock) generated from the clock-generating circuit.

According to the present invention, the data can be stably reproduced irrelevant to the number of continuous clocks of the recorded recording mark. Therefore, the present invention makes it possible to reliably detect the reproduced signal with the optimum values of the reproducing light beam and the reproducing magnetic field irrelevant to the clock number of the recording mark when the reproduction is performed in accordance with the reproducing method of the type in which not only the reproducing light beam but also the reproducing magnetic field is applied during the reproduction, for example, in accordance with the MAMMOS system.

What is claimed is:

1. A recording method on an optical recording medium for recording, as information, recording marks having a variety of lengths on the basis of a clock, on the optical recording medium including at least a recording layer, the method comprising:

forming a recording mark having a length shorter than nT on the optical recording medium as a recording signal corresponding to an amount of n clocks wherein n is an integer and T is a channel bit length.

2. The recording method according to claim 1, wherein shortness of the recording mark corresponding to nT is changed depending on n.

3. The recording method on the optical recording medium according to claim 1, wherein the recording signal corresponding to the amount of n clocks is converted into a recording signal shorter than the recording signal corresponding to the amount of n clocks, and the recording mark having the length shorter than nT is formed on the optical recording medium on the basis of the converted recording signal.

4. The recording method according to claim 1, wherein the recording signal corresponding to the amount of n clocks is shortened by removing at least a recording signal corresponding to an amount of 1 clock from the recording signal corresponding to the amount of n clocks.

5. The recording method according to claim 3, wherein the recording signal corresponding to the amount of n clocks is shortened by removing at least a recording signal corresponding to an amount of 1 clock from the recording signal corresponding to the amount of n clocks.

6. The recording method according to claim 3, wherein the recording signal corresponding to the amount of n clocks is shortened by removing at least a recording signal corresponding to an amount of 1 clock from a front portion and a rear portion of the recording signal corresponding to the amount of n clocks, respectively.

7. The recording method according to claim 1, wherein the optical recording medium is a magneto-optical recording medium.

8. The recording method according to claim 5, wherein the magneto-optical recording medium is a magneto-optical recording medium comprising a magnetic recording layer and a reproducing layer, and the recording mark recorded in the magnetic recording layer is transferred in a magnified form to the reproducing layer by radiating a light spot and applying a magnetic field during reproduction.

9. The recording method according to claim 7, further comprising modulating a reproducing magnetic field in synchronization with the clock and applying the magnetic field to the magneto-optical recording medium while radiating light to reproduce the information.

10. The recording method according to claim 8, wherein a scanning distance of the light spot per 1 clock on the magneto-optical recording medium during reproduction is T, and the recording mark having the length shorter than nT is reproduced as the recording mark corresponding to the amount of n clocks.

11. A reproducing method for reproducing information recorded on an optical recording medium including recording marks having a variety of lengths formed thereon on the basis of a clock, the method comprising:

using the optical recording medium on which a recording mark having a length shorter than nT is formed as a recording signal corresponding to an amount of n clocks wherein n is an integer and T is a channel bit length; and reproducing the information in synchronization with the clock while radiating a reproducing light beam.

12. The reproducing method on the optical recording medium according to claim 11, wherein the recording signal corresponding to the amount of n clocks is converted into a recording signal shorter than the above, and the recording mark having the length shorter than nT is formed on the optical recording medium on the basis of the converted recording signal.

13. The reproducing method according to claim 12, wherein the optical recording medium is a magneto-optical recording medium comprising a magnetic recording layer and a reproducing layer, and the recording mark recorded in the magnetic recording layer is transferred in a magnified form to the reproducing layer by radiating a light spot and applying a magnetic field during the reproduction.

14. The reproducing method according to claim 11, wherein a scanning distance of a light spot per 1 clock on the optical recording medium during reproduction is T, and the recording mark having the length shorter than nT is reproduced as the recording mark corresponding to the amount of n clocks.

15. The reproducing method according to claim 11, wherein shortness of the recording mark corresponding to nT is changed depending on n.

16. A recording apparatus for an optical recording medium, comprising:

a clock-generating circuit;

a recording length-correcting circuit for correcting a recording signal length so that a recording mark having a length shorter than nT is formed on the optical recording medium as a recording signal corresponding to an amount of n clocks wherein n is an integer and T is a channel bit length; and an applying unit for modulating and applying at least one of a light beam and a magnetic field to the optical recording medium on the basis of an output from the recording length-correcting circuit.

17. The recording apparatus according to claim 16, wherein the recording length-correcting circuit converts a code length corresponding to a mark length to a code length shorter than the code length corresponding to the mark length.

18. The recording apparatus according to claim 17, wherein the mark length-correcting circuit includes a code conversion table on which the mark length is converted to be shortened.

19. The recording apparatus according to claim 18, wherein the mark length-correcting circuit changes shortness of the recording mark corresponding to nT depending on n.

20. The recording apparatus according to claim 17, wherein the recording length-correcting circuit further includes an address retrieval memory, a mark length-identifying circuit, and a memory for storing the mark length corrected by the mark length-correcting circuit.

21. The recording apparatus according to claim 16, wherein the recording medium is a magneto-optical recording medium, the applying unit includes a light-radiating unit and a magnetic field-applying unit, and the magnetic field-applying unit applies a magnetic field to the magneto-optical recording medium on the basis of a corrected recording signal supplied from the recording length-correcting circuit.

22. The recording apparatus according to claim 21, further comprising a data modulator.

23. The recording apparatus according to claim 22, further comprising a data demodulator, and a detector for detecting a reflected light beam from the optical recording medium, thereby making it possible to reproduce the information.

24. The recording apparatus according to claim 23, wherein the data demodulator demodulates the recording mark having the length shorter than nT recorded on the optical recording medium to produce the signal corresponding to the amount of n clocks.

25. The recording apparatus according to claim 24, wherein the magnetic field-applying unit applies the reproducing magnetic field to the magneto-optical recording medium when the information is reproduced.

26. The recording apparatus according to claim 25, wherein the magneto-optical recording medium is a magneto-optical recording medium comprising a magnetic recording layer and a reproducing layer, and the recording mark recorded in the magnetic recording layer is transferred in a magnified form to the reproducing layer by radiating the light beam and applying the magnetic field during the reproduction.

* * * * *